United States Patent [19]
Kundert

[11] Patent Number: 4,900,179
[45] Date of Patent: Feb. 13, 1990

[54] MOUNTING CROSS-PIECE ASSEMBLY AND MOUNTING CROSS-PIECE THEREOF

[75] Inventor: Walter Kundert, Dietikon, Switzerland

[73] Assignee: Luwa AG, Zurich, Switzerland

[21] Appl. No.: 147,740

[22] Filed: Jan. 25, 1988

[30] Foreign Application Priority Data

Jan. 30, 1987 [CH] Switzerland ............... 00324/87

[51] Int. Cl.$^4$ ............... F16D 1/04; F16B 7/04
[52] U.S. Cl. ............... 403/174; 403/178; 403/217; 52/488; 52/665; 411/230; 411/275; 411/936
[58] Field of Search ............... 403/170, 173, 174, 178, 403/258, 217, 264, 407.1; 52/488, 484, 665; 411/230, 275, 324, 511, 516, 517, 522, 523, 936, 980–982

[56] References Cited

U.S. PATENT DOCUMENTS

| | | | |
|---|---|---|---|
| 1,631,819 | 6/1927 | Ivory | 411/936 X |
| 3,261,625 | 7/1966 | Cripe | 403/173 |
| 3,429,601 | 2/1969 | Bremers | 403/230 |
| 3,542,407 | 11/1970 | Brown | 403/173 X |
| 3,742,674 | 7/1973 | Lang | 52/584 X |
| 3,901,613 | 8/1975 | Andersson | 403/174 X |
| 4,678,487 | 7/1987 | Caldwell, Jr. et al. | 52/665 X |

FOREIGN PATENT DOCUMENTS

| | | |
|---|---|---|
| 627100 | 1/1963 | Belgium . |
| 7225523 | 7/1972 | Fed. Rep. of Germany . |
| 3115913 | 11/1982 | Fed. Rep. of Germany . |
| 8500198 | 10/1985 | Fed. Rep. of Germany . |
| 2122006 | 8/1972 | France . |
| 2123249 | 8/1972 | France . |
| 6803400 | 9/1969 | Netherlands . |

OTHER PUBLICATIONS

Luwa, Clean Room Technology, Fundamental Principles and Applications, 1987.

*Primary Examiner*—Andrew V. Kundrat
*Assistant Examiner*—Arlen L. Olsen
*Attorney, Agent, or Firm*—Cushman, Darby & Cushman

[57] ABSTRACT

The mounting cross-piece or node assembly serves for the leak-tight connection of the cut ends of profile sections with one another. These profile sections are provided with an upper lengthwise extending opening and thus form a support or carrier construction or framework in the form of a grid or grid structure suspended at the ceiling of a room, especially a clean room. Filter frames and clean room filters can be mounted in gastight fashion in the grid structure. The mounting cross-piece assembly comprises at the cut surfaces of the profile sections to be interconnected and at the sides of the mounting cross-piece confronting such cut surfaces connection elements which can be secured in both of these components. Each of these connection elements is structured such that after insertion into a profile section through the lengthwise opening of the latter it can be frictionally or force-lockingly connected therewith and also can be released from above therefrom at the finished installed grid or grid structure, so that the relevant profile section and, if desired, also a mounting cross-piece can be removed from the support carrier construction and, if desired, again remounted therein, without the necessity of cutting a profile section or destroying the mounting cross-piece or the remaining support construction.

24 Claims, 10 Drawing Sheets

FIG. 3
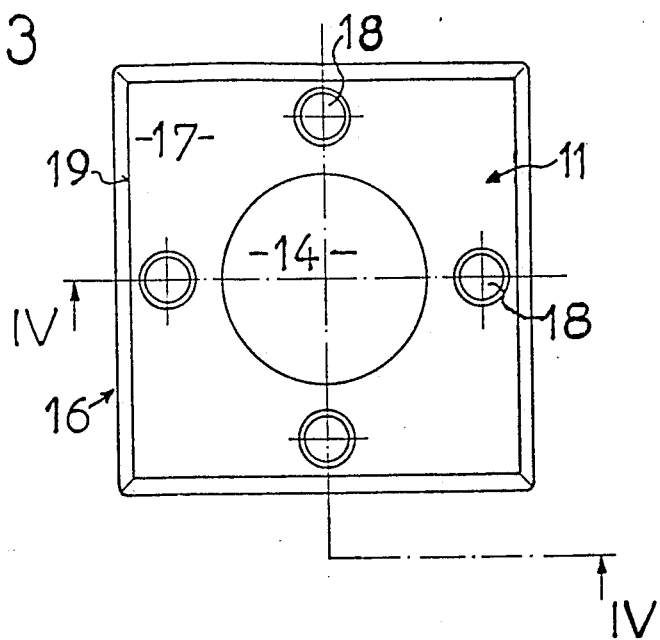
FIG. 4
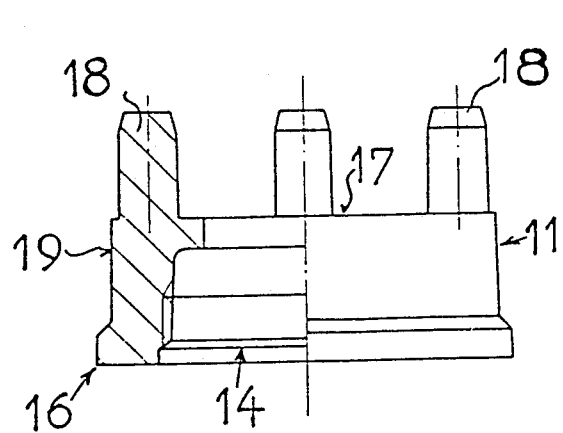
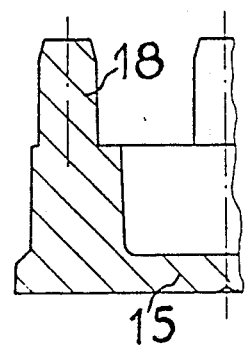
FIG. 5

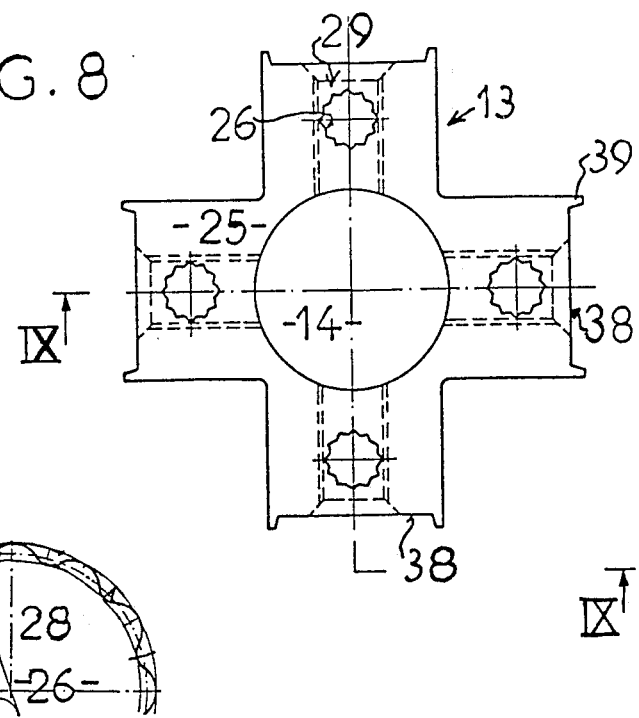
FIG. 8
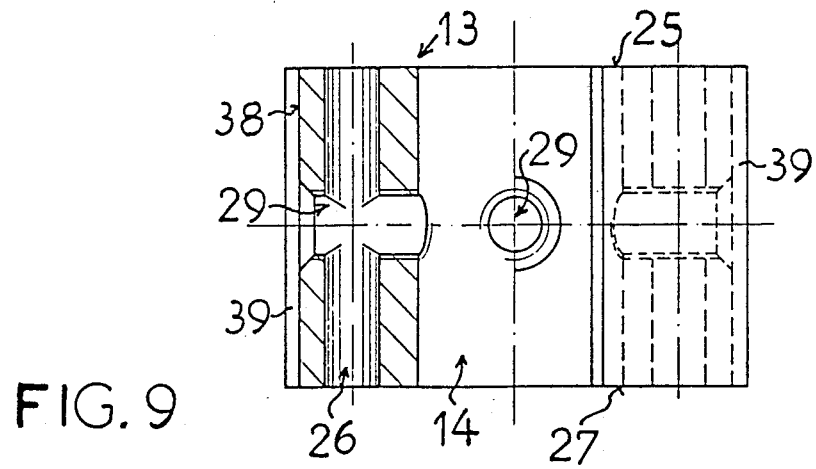
FIG. 8A
FIG. 9

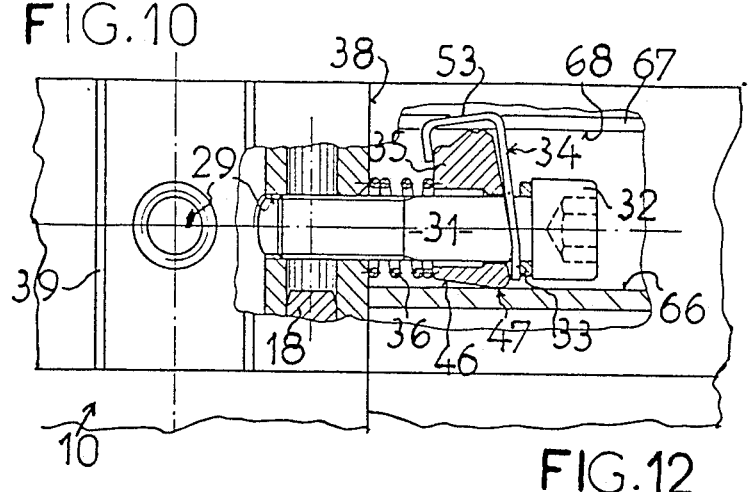
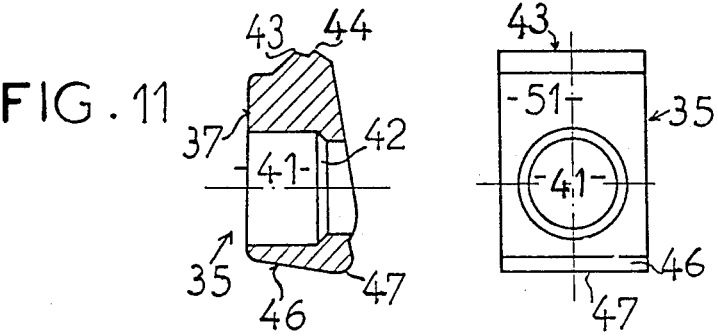
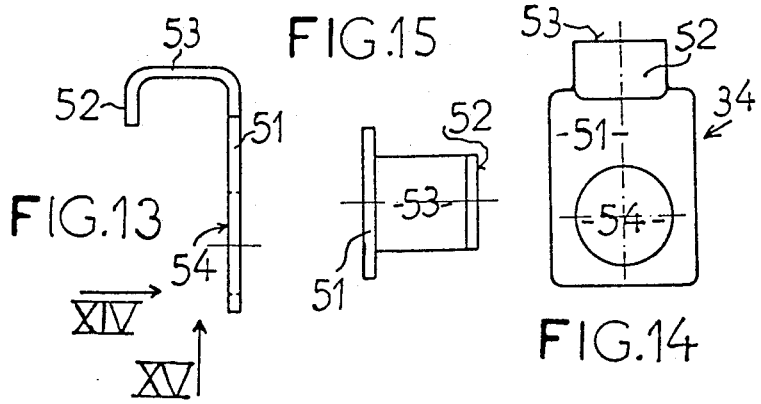

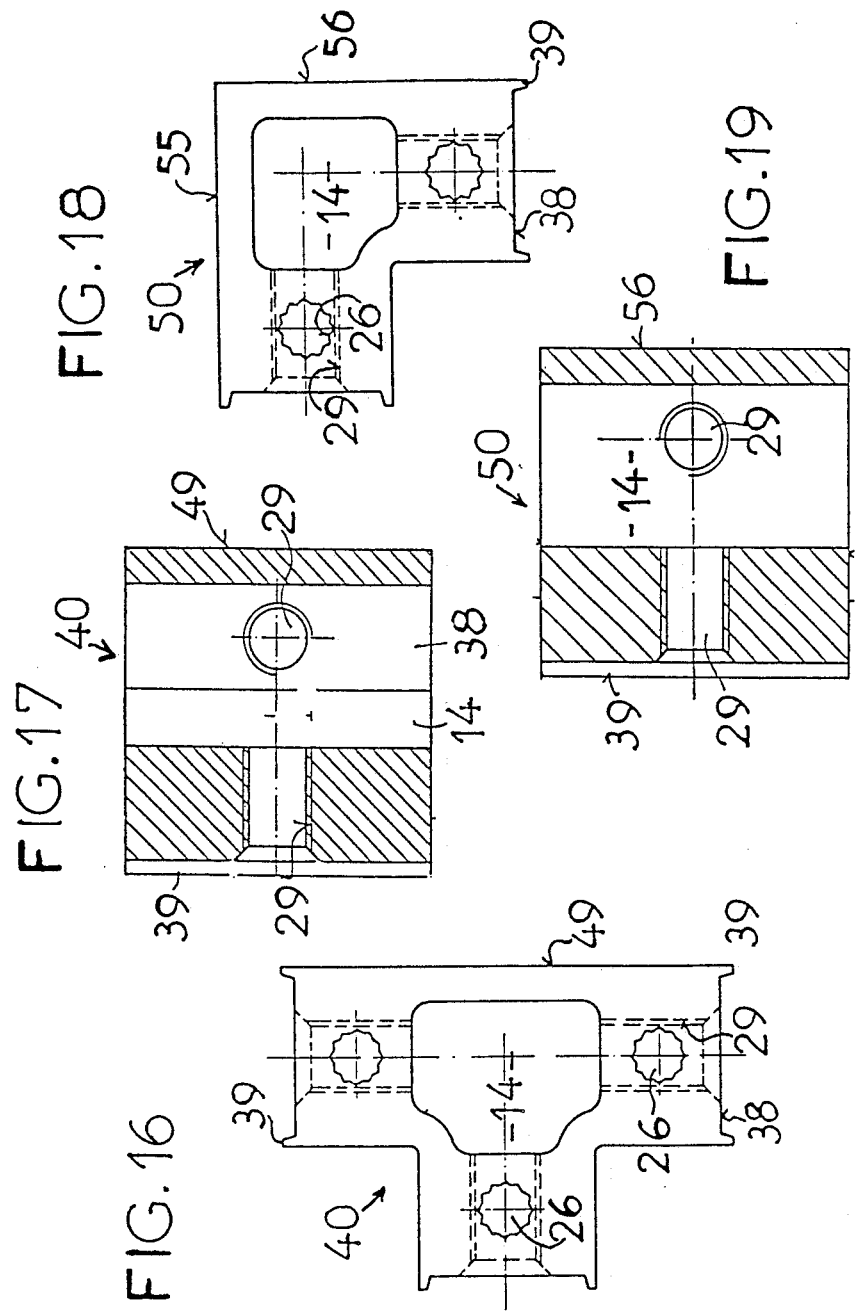

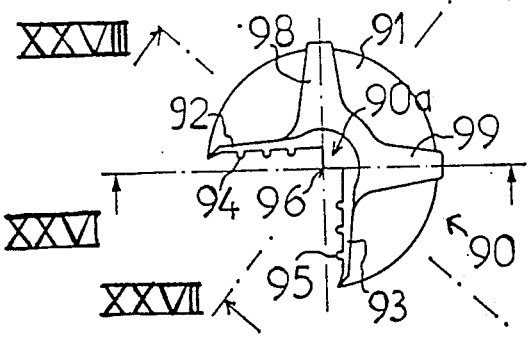
FIG. 25
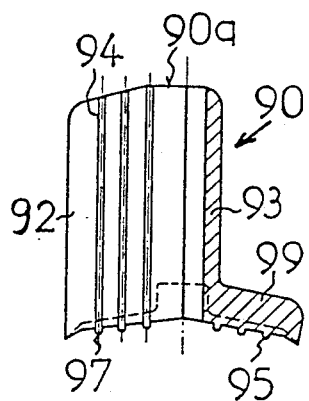
FIG 26
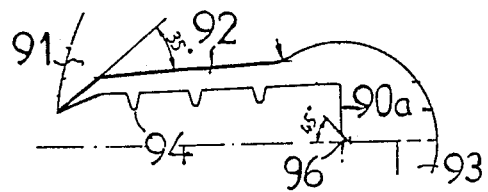
FIG. 25A
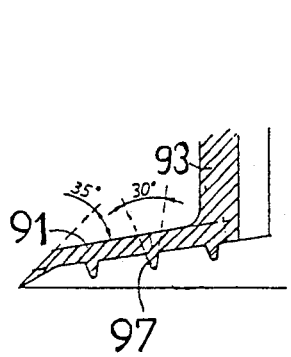
FIG. 28
FIG 27

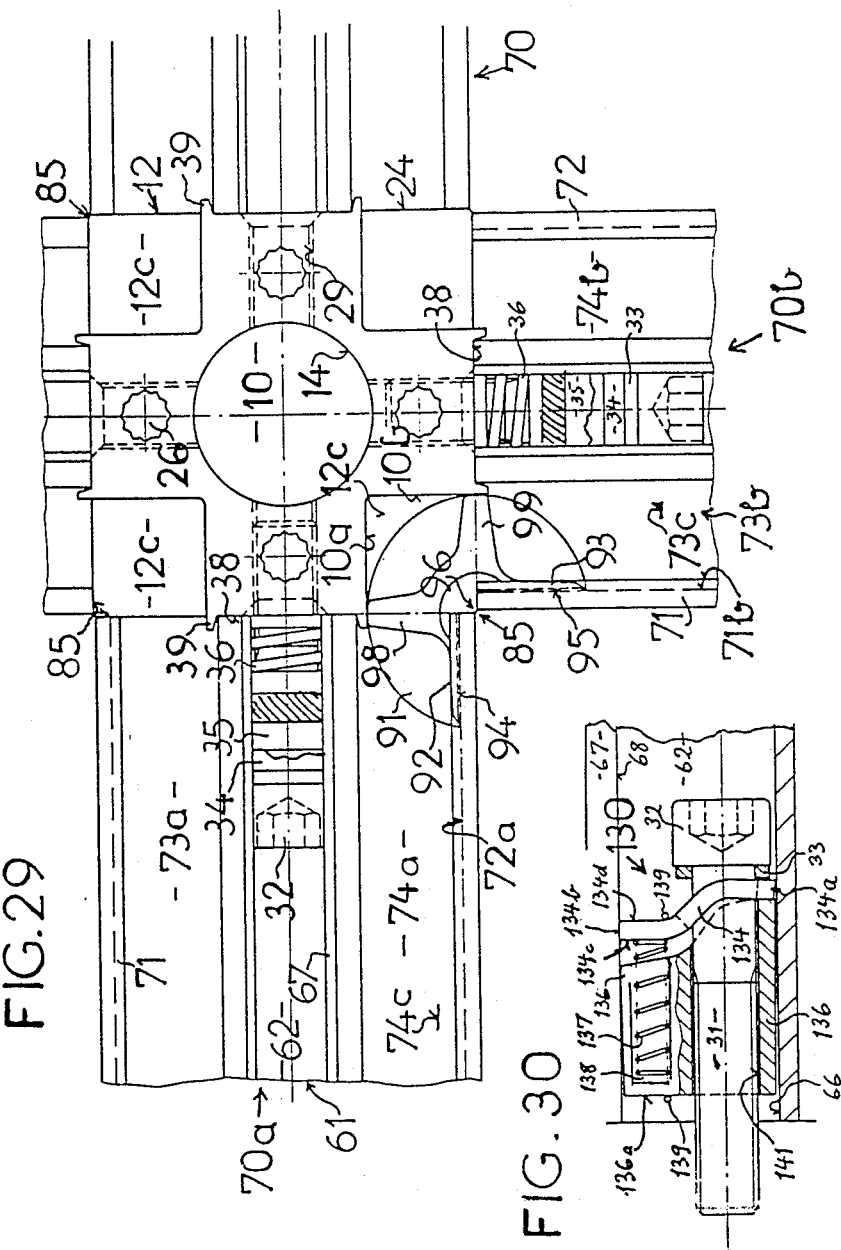

MOUNTING CROSS-PIECE ASSEMBLY AND MOUNTING CROSS-PIECE THEREOF

BACKGROUND OF THE INVENTION

The present invention broadly relates to the building or construction art and, more particularly, concerns a new and improved mounting cross-piece or node assembly as well as an improved mounting cross-piece or node.

Generally speaking, the mounting cross-piece assembly of the present development serves for the sealed or leak-tight connection of the cut ends of profiles or profile sections of a support or carrier construction, also referred to as a framework, which is to be suspended at the ceiling of a room. Each such profile or profile section is provided with a lengthwise or longitudinal opening. Such type of support or carrier construction or framework can be especially employed for mounting filter frames of clean room filters in gas-tight fashion in the support or carrier construction. A connection element is provided which, on the one hand, can be inserted into the cut end of the profile which is to be connected with the mounting cross-piece and, on the other hand, into a side of the mounting cross-piece of the mounting cross-piece assembly or unit, and which side confronts the profile section. Such connecting element can then be secured in both of these components or parts.

Such type of mounting cross-piece assembly is generally known from the disclosure of the German Petty Patent No. G 85 00 198.8, published Dec. 12, 1985, and assigned to Klima und Kälte GmbH Beratung und Vertrieb für Klima und Kältetechnik, located at 6300 Giessen, West Germany. However, the therein described threaded connection of the support or girder profiles or profile sections with the mounting cross-pieces, and which threaded connection is disclosed as part of the grid ceiling, is afflicted with the shortcoming that it is not possible to remove or disassemble from the finished mounted grid structure individual support or girder profiles or profile sections without cutting the profile section or destroying the grid structure.

Also, seals or sealing means which have been possibly mounted at a mounting cross-piece and which, for instance, seal the connection joints with the profile sections, usually cannot be exchanged without cutting out or destroying the mounting cross-piece. According to another known support or carrier ceiling construction it is necessary to destroy a number of rivets in order to be able to remove a single profile or profile section from the finished support or carrier ceiling construction.

Generally, the end surfaces of the support or girder profiles or profile sections which are to be joined at a mounting or assembly intersection or cross or at similar cross-piece assemblies require a special, extremely accurate machining prior to the fabrication of the connection with the mounting cross-piece or node, in order to establish the requisite seal between the end surfaces of the profile sections and the corresponding connection surfaces of the mounting cross-piece. This, in turn, necessitates the availability of appropriate equipment at the factory or plant or workshop and, in particular, the availability of specially trained personnel, both of which are especially not readily available at remote locations or regions, for instance in relatively unpopulated or underdeveloped regions.

Heretofore known connection structures, and this is equally true of the above-described prior art construction, also require a particular design of the mounting cross-piece entailing the provision of a recess or recesses at each connection surface of the cross-piece, the configuration of which must be exactly accommodated to that of the related or associated connection element.

SUMMARY OF THE INVENTION

Therefore, with the foregoing in mind it is a primary object of the present invention to provide a new and improved construction of a mounting cross-piece or node assembly and mounting cross-piece or node thereof which do not suffer from the aforementioned drawbacks and shortcomings of the prior art constructions.

Another and more specific object of the present invention aims at the realization of a new and improved construction of a mounting or installation cross-piece assembly wherein, even when the support or carrier structure or framework has been completely erected or assembled together, allows releasing the connection between the profile sections and the mounting cross-pieces and, moreover, a predeterminate profile section and equally, if desired, the mounting cross-piece can be readily dis-assembled or removed and also, if desired, again re-assembled or re-mounted at the support or carrier structure or framework without having to cut a profile section or destroying the mounting cross-piece or the remaining support or carrier structure or framework.

Another important object of the present invention aims at providing a new and improved construction of a mounting structure of the previously mentioned type in which the seals for sealing the connection joints between the mounting cross-pieces and the profiles or profile sections are only subjected to modest loads and thus their sealing action is ensured for throughout longer periods of time.

It is also a prominent object of the present invention to be able to exchange the seals or sealing means under the same conditions as above described and which serve for sealing the connection joints or joins between the mounting cross-pieces and the profiles or profile sections and the finished erected support structure.

Yet a further notable object of the present invention, aims at constructing the mounting cross-piece assembly in such a fashion that such can be simultaneously connected with profile sections of different types and height, which need only fulfil certain conditions as concerns their external dimensions, without having to alter the construction or design of the mounting cross-piece.

It is yet a further significant object of the present invention to provide a mounting cross-piece or node in a mounting assembly or unit which not only fulfils the aforenoted objectives, but the fabrication of which is appreciably simpler and less expensive than that involved with the most commonly employed mounting cross-pieces which are presently utilized in this technology.

Now in order to implement these and still further objects of the invention, which will become more readily apparent as the description proceeds, the mounting cross-piece or node assembly of the present development is manifested by the features that the connection element which is connected with the mounting cross-piece, after insertion into the profile section through the lengthwise opening of such profile section is frictionally or force-lockingly connected with the profile section and also, in the finished assembled or erected state of the support or carrier structure or framework, can be released from above and from the associated profile section and equally, if desired, the mounting cross-piece itself can be removed or disassembled and, if desired, also the removed components or elements again, can be re-mounted in the support or carrier structure or framework without having to cut any profile section or destroying the mounting cross-piece or the remaining part of the support or carrier structure or framework.

The invention also contemplates a mounting cross-piece for use in the mounting cross-piece assembly. This mounting cross-piece preferably is of quadratic, such as square, section or cross-sectional configuration and contains at least two connection surfaces. These connection or joining surfaces serve for the connection with cut surfaces of the profile sections and are preferably vertically disposed. Each of the connection surfaces contains a bore or hole intended for the insertion of a connection element. The mounting cross-piece is of multi-part construction. This multi-part mounting cross-piece has a cross-piece lower portion and sealing means which at least partially cover the lower portion at least in zones beneath the connection surfaces. This multi-part mounting cross-piece further contains a cross-piece upper portion which is provided at each of at least two sides with one of the connection surfaces as well as with related guide means coacting with the cut surfaces of the profile sections and preferably protruding beyond the lower portion. The mounting cross-piece, if desired, is provided with a central throughpass channel or throughpassage which extends through the mounting cross-piece in vertical direction thereof.

A particular advantage of the mounting cross-piece assembly according to the present invention resides in the possibility of fabricating the lower portion and upper portion of the mounting cross-piece by continuous casting or extrusion. The individual upper portions of the mounting cross-piece can be cut off of the continuously cast product. This is in contrast to the heretofore known mounting cross-pieces or crosses which conventionally were fabricated as pressure cast elements. This fabrication technique is undesirably associated with an appreciable expenditure in tools or equipment, particularly because of the large number of required slides or the like.

In this regard it is particularly advantageous that upper portions or parts of the cross-pieces which possesses different heights can be produced. These upper portions of the cross-pieces thus can be accommodated to or coordinated with different profile sections of different heights without any difficulties. Also, one and the same mounting cross-piece, as contemplated by the present invention, can be readily connected with profile sections of different cross-sectional configurations, as long as the profile sections fulfil certain conditions as concerns their external dimensions and possess a sufficient space for the insertion of the inventive connection element.

The frictional or force-locking connection of the profiles or profile sections with the inventive mounting cross-pieces, especially a clamp or gripping-type connection, and the attachment of the connection elements of the mounting cross-piece assembly at the mounting cross-pieces by means of a single adjustment or adjusting threaded bolt forming part of the connection element constitutes a decisive simplification in contrast to heretofore known mounting cross-pieces which frequently required a multiplicity of threaded screws for establishing a single such connection.

The assembly of the support or carrier structure or construction which is to be erected or built together from profile sections and mounting cross-piece assemblies according to the invention, can be accomplished on site and in the desired room or area where the erection is to be perfected. What is important in this regard is that the entire assembly of the support or carrier structure can be accomplished from above, that is to say, from the side confronting the ceiling of the room or the like. As a result, there does not exist the necessity of inverting the finished erected structure before it can be raised by a suitable lifting device up to the desired spacing from the ceiling of the room and then can be suspended thereat in conventional fashion.

The end of a profile or profile section intended for connection with a connection or joining surface of the inventive mounting cross-piece can be cut in conventional manner, preferably at a right angle, for instance advantageously by means of a circular saw. Moreover, the cut surface then does not require any further machining or processing, as such is usually unavoidably demanded with the heretofore known constructions.

It is therefore easy to assemble together as a grid structure a completely planar or flat ceiling construction in a most simple manner with the aid of the mounting cross-piece assembly which can be inexpensively fabricated and sealingly or leak-tight connected with the cut surfaces of the profile sections which have not been specially machined or processed.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein:

FIG. 3 is a top plan view of the lower portion or part of the multi-part mounting cross-piece depicted in FIG. 1;

FIG. 4 is a side view of the lower portion or part of the mounting cross-piece depicted in FIGS. 1 to 3, partially in axial sectional view, viewed in a plane taken substantially along the section line IV—IV of FIG. 3;

FIG. 5 is a fragmentary axial sectional view of a somewhat modified embodiment of the lower portion or part of the mounting cross-piece or node, containing a closed bottom or base and with the showing similar to the arrangement of FIG. 4;

FIG. 8 is a top plan view of the upper portion or part of the mounting cross-piece for interconnecting the profile sections, of the actual cross-piece of the mounting cross-piece assembly or unit;

FIG. 8A is a fragmentary detail showing, on an enlarged scale, of one of the mounting holes or openings of the upper portion or part of the mounting cross-piece depicted in FIG. 8;

FIG. 9 is a side view of the upper portion or part of the cross-piece depicted in FIG. 8 with one-half shown in axial sectional view in a plane taken substantially along the section line IX—IX depicted in FIG. 8;

FIG. 10 is a side view, partially in section, of one of the tightening or clamping devices of the mounting cross-piece assembly of the embodiments depicted in FIGS. 1 to 9, and partially shown in longitudinal sectional view;

FIG. 11 is a front view, in longitudinal section, of the tilting block or element used in the tightening or clamping device depicted in FIG. 10;

FIG. 12 is a front view of the tilting block or element depicted in FIG. 11 as viewed substantially in the direction of the arrow XII thereof;

FIG. 13 is a side view of the blade or leaf spring depicted in conjunction with the tightening or clamping device shown in FIG. 10;

FIG. 14 is a front view of the blade or leaf spring shown in FIG. 13 viewed in the direction of the arrow XIV thereof;

FIG. 15 is a bottom view of the blade or leaf spring depicted in FIG. 13 and looking in the direction of the arrow XV thereof but turned through an angle of approximately 180°;

FIG. 16 is a top plan view of a second exemplary embodiment of the mounting cross-piece or node assembly according to the invention;

FIG. 17 is an axial sectional view through the second exemplary embodiment of the mounting cross-piece or node assembly depicted in FIG. 16, taken in a plane indicated substantially by the section line XVII—XVII of FIG. 16;

FIG. 18 is a top plan view of a third exemplary embodiment of mounting cross-piece or node assembly according to the present invention;

FIG. 19 is an axial sectional view through the third exemplary embodiment of mounting cross-piece assembly depicted in FIG. 18, taken in a plane substantially along the section line XIX—XIX thereof;

FIG. 25 is a top plan view of a corner seal or seal means depicted in perspective illustration in the arrangement of FIG. 24;

FIG. 25A is a detail of the corner seal or seal means depicted in FIG. 25 and shown on an enlarged scale;

FIG. 26 is a longitudinal sectional view through the corner seal or seal means depicted in FIG. 25, through a plane taken substantially along the sectional line XXVI—XXVI of FIG. 25;

FIG. 27 is a longitudinal sectional view through the corner seal or seal means in a different plane indicated in FIG. 25 by the section line XXVII—XXVII;

FIG. 28 is a fragmentary view of the corner seal in longitudinal section taken substantially in a plane indicated in FIG. 25 by the section line XXVIII—XXVIII;

FIG. 29 is a top plan view of the mounting cross-piece or node assembly depicted in FIG. 1 with portions of two profiles or profile sections connected with the mounting cross-piece as well as depicting a corner seal; and FIG. 30 is a side view, partially in axial section, of a further preferred embodiment of a connection element of the mounting cross-piece or node assembly according to the invention.

DETAILED DESCRIPTION OF THE PREFERRED EMBODIMENTS

Describing now the drawings, it is to be understood that to simplify the showing thereof, only enough of the construction of the various embodiments of mounting cross-piece or cross or node assemblies or units and the related profile sections or profiles forming the grid or grid structure of a framework for a ceiling structure or the like has been depicted therein as is needed to enable one skilled in the art to readily understand the underlying principles and concepts of this invention.

Figure 24:
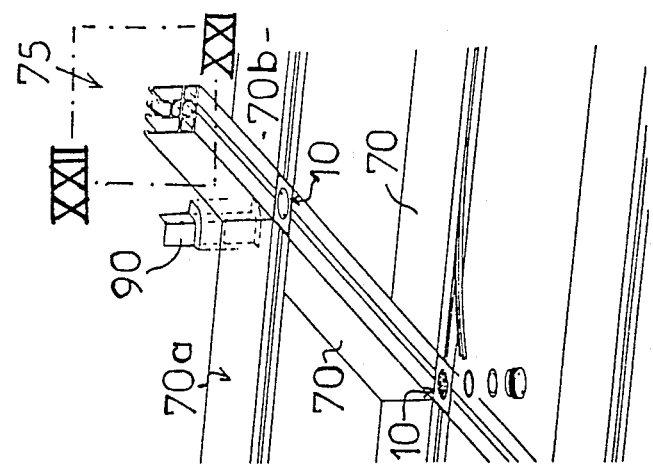
FIG. 24 is a schematic illustration of a further support or carrier structure assembled together from profile sections or profiles of the type depicted in FIG. 22 and interconnected with one another by mounting cross-piece assemblies or units of the same type of design or construction.
Figure 23:
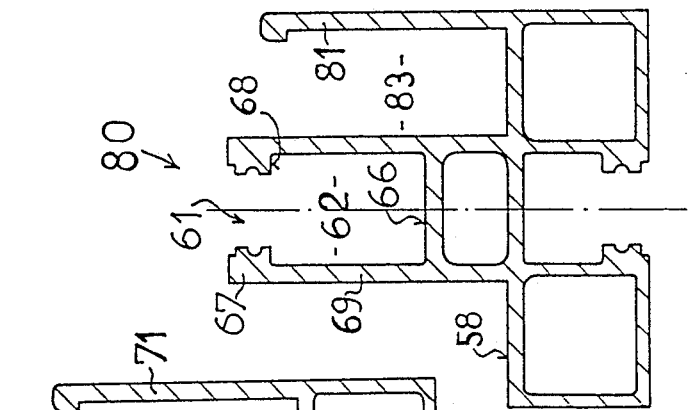
FIG. 23 is a cross-sectional view through a third exemplary embodiment of profile section or profile which can be connected with the mounting cross-piece or node assembly according to the invention.

Turning now specifically to the exemplary embodiment of mounting cross-piece or node 10 depicted in FIGS. 1 to 9 as well as FIGS. 23 and 24, and which constitutes the main element or component of the mounting cross-piece assembly or unit of the present invention, it will be seen that such mounting cross-piece comprises a lower portion or part 11, a formed or molded seal element or seal 12 and a cross-piece upper portion or part 13.

Usually the mounting cross-piece 10 has formed therein a relatively wide central bore or hole or channel or throughpassage 14 which piercingly extends substantially vertically or perpendicular through the lower portion or part 11, the seal element 12 and the upper portion or part 13 in the direction of the central lengthwise axis A of the mounting cross-piece 10.

The lower portion or part 11 of the mounting cross-piece 10 depicted in FIGS. 3 and 4 will be seen to possess a substantially quadratic sectional configuration, for instance a square configuration, containing the circumferential or marginal edge or region 16. At the substantially flat upper side or face 17 of the lower portion or part 11 of the mounting cross-piece 10 there upwardly protrude four pin or plug members 18. In the embodiment depicted in FIG. 5 of the modified construction of the lower portion or part 11 of the mounting cross-piece 10 the same does not possess any central throughpassage or opening or the like, rather a closed bottom or base 15.

The circumferential or enclosing side wall 19 of the lower portion or part 11 of the mounting cross-piece 10 is preferably slightly conically upwardly tapered, and the deviation from the vertical amounts to, for instance, only about 1°. This facilitates the mounting or fitting of the sealing element or seal 12 thereon and such seal or sealing element 12 has been depicted in greater detail in FIGS. 6 and 7.

This seal or sealing element 12 is likewise of substantially quadratic cross-section or sectional configuration, here again for instance of substantially square shape or configuration, and dimensioned such that the axially extending lengthwise or longitudinal ribs or rib members 21 formed at its inner side walls or surfaces 20 can be pressed onto the circumferential or enclosing side wall 19 until seated upon the protruding edge 16 of the lower portion or part 11. At the upper end wall 22 of the seal or sealing element 12, by means of which this sealing element 12 can bear upon the upper surface or top face 17 of the lower portion 11 of the mounting cross-piece 10, there are provided openings or holes 23 through which upwardly protrude the pin or plug members 18. The formed or molded seal or sealing element 12 is advantageously fabricated from the well known material "NEOPREN" or another non-foamed, compact elastic sealing material having properties corresponding to that of "NEOPREN", for instance having a Shore hardness of 60.

In the presence of a sealing pressure at a formed or molded part from the outside, for instance at the outer side wall 24 of the formed or molded seal or sealing element 12, the material thereof can easily escape or flow into the hollow spaces or voids present between the lengthwise or longitudinal ribs 21 and into the circumferential side walls 19 of the lower portion or part 11 of the mounting or installation cross-piece 10.

The upper portion or part i.e. the "cross-piece element" 13 can be mounted upon the seal or sealing element 12, as such has been depicted in FIGS. 8, 8A and 9. The upper portion 13, viewed in top plan view, defines an equal-armed cross, as best seen by referring to FIG. 8.

At its upper end surface 25, there is present the opening of the large central throughpassage or hole 14 and also the openings of four open-ended or continuous holes or bores 26 which are co-formed during extrusion of the upper portion 13 of the mounting cross-piece 10. Fitting into these bores or holes 26 from the under or lower side 27 of the upper portion or part 13 are the pins or plug members 18 of the lower portion 11 which protrude out of the upper end wall 22 of the seal 12. These pins or plug members 18 can be provided with an axial grooving or groove structure, so that they sealingly or tightly and fixedly connect the upper portion or part 13 with the lower portion or part 11. Of course, the grooving or groove structure, indicated in FIG. 8A by reference character 28, instead of being provided at the outer wall of the pin or plug member 18, can be provided in the inner wall of each bore or hole or opening 26.

Under certain circumstances, during pressing of the upper portion or part 13 onto the pin or plug members 18 there can be formed, by virtue of the grooving or groove structure 28 of the walls of the bores or holes 26 which receive the pins or plug members 18, a slight amount of small chips or the like which if left to remain between the pins or plug members 18 and the wall of the holes or openings 26 could result in a skewed or inclined posture of the upper portion 13 and lower portion 11 of the mounting cross-piece 10. By virtue of the presence of the grooving or groove structure 28, these chips or the like can, however, escape into the grooving or groove structure 28 between the ribs of such grooving or groove structure 28 where they have no adverse effects.

Finally, the upper portion or part 13 of the mounting cross-piece 10 possesses at each of its four radial arms, a transverse bore or hole 29 provided with internal threads. These internally threaded transverse bores or holes 29 serve to receive the associated end of an adjustment or adjusting element defining a support or carrier element, here shown as an adjustment bolt or bolt member 31 (FIG. 12) provided with external threads or threading and which opens into the lateral end face or surface 28 of the associated arm.

At each of the end surfaces or faces 38 of its cross-arm arrangement the mounting or installation cross-piece 10 furthermore carries two guide ledges or ledge members 39 at spaced relationship from one another and which extend substantially vertically, once such guide ledge 39 extending to the right and the other to the left of the opening or mouth of the transverse bore or hole 29. The function of these guide ledges or ledge members 39 will be explained more fully hereinafter.

Each of the four adjustment or adjusting bolts or bolt members 31 constitutes an element or component of a connection element 30 which has been depicted in FIGS. 10 to 15, and of which in each case one is threadably connected into each of the four arms of the upper portion or part 13 of the mounting cross-piece 10.

The adjustment or adjusting bolt member 31 carries at its end which is situated opposite to the end provided with the external threads an internal hexagonal head portion 32 provided with an underlay disc or shim 33 which can be adjusted with an internal hexagonal-ball head socket key or tool or the like. The lengthwise or longitudinally extending opening 61 (FIG. 20) of the profile section or profile 60 affords access for this tool. Seated upon each of the adjustment bolts or bolt members 31 in succession, as viewed from the hexagonal head portion 32 of the adjustment bolt 31, are a tilting or tilt spring 34, a tilt or tilt block or element 35 and a compression or pressure spring 36. The compression or pressure spring 36 loads the tilting block 35 into the neutral position depicted in phantom or chain-dot lines in FIG. 10. This compression or pressure spring 36 bears at one end at the side 37 of the tilting block 35 confronting the mounting cross-piece 10 and at the other end at the lateral end surface 38 of the related arm of the mounting cross-piece 10 and which lateral end surface 38 surrounds the transverse bore or hole 29.

The tilting block or element 35 which has been depicted in FIGS. 11 and 12, possesses a wide transverse stepped bore or opening 41 through which there can be guided the adjustment bolt or bolt member 31. This wide transverse stepped bore 41 possesses a constricted or narrowed portion 42 in order to be able to better guide the adjustment bolt 31. However, the constricted portion 42 must be still wide enough in order to allow for a slight tilting of the tilting block or element 35 into a clamped position which has been depicted in full lines in FIG. 10. At its upper end the tilting block or element 35 possesses two ribs or rib members 43 and 44 which extend transverse to the lengthwise axis of the adjustment bolt 31. The tilting block or element 35 also is provided with a base or bottom surface 46 which extends, from the side 37 of the tilting block 35 which confronts the mounting cross-piece 10, at an inclination downwardly up to the rounded or curved end 47 which faces away from the mounting cross-piece 10. By means of this base or bottom surface 46 the tilting block or element 35 can be tilted both into its neutral as well as also with its upper end, even though slightly, away from the mounting cross-piece 10 and thus is shifted somewhat further at the rounded or curved end or portion 47, into its clamped position at the floor or base 66 of the upwardly open chamber or compartment 62 of the profile section 60, as such will be further explained in greater detail with reference to FIGS. 20 to 24.

The tilting or tilt spring 34 depicted in FIGS. 13 to 15 is constituted, for instance, by a leaf or blade spring of substantially bent U-shaped lengthwise section. This tilting spring or spring member 34 possesses a longer arm or arm member 51 and a shorter arm or arm member 52 which are interconnected with one another by a spring head portion or part 53. In the longer U-shaped arm or arm member 51 there is provided an opening or hole 54 through which there can be inserted the adjustment bolt or bolt member 31, as such has been depicted in FIG. 10.

The function of each connection element 30 with the parts or components 31, 34, 35 and 37 will be explained more fully hereinafter in conjunction with FIG. 20.

Before doing so, however, there will be briefly described two further constructions of the mounting cross-piece or cross or node, and specifically the constructions depicted in FIGS. 16 and 17 and FIGS. 18 and 19, respectively. The modified construction of mounting cross-piece or node 40 depicted in FIGS. 16 and 17 is suitable for the connection or joining of the ends of three profiles or profile sections, and the further modified construction of mounting cross-piece or node 50 depicted in FIGS. 18 and 19 is suitable for the connection or joining of the ends of two profiles or profile sections which are disposed at substantially right angles with respect to one another. In contrast to the mounting cross-piece 10 of the embodiment depicted in FIGS. 1 to 9 and suitable for providing four connection or joining locations for the profiles or profile sections, the mounting cross-piece 40 with three connection or joining locations can be beneficially used at the edge of a support ceiling framework, whereas the mounting cross-piece 50 can only be used at the corners of such construction.

As a matter of convenience, the same parts or components having the same functions as in the embodiments of FIGS. 1 to 9 have also been conveniently generally designated by the same reference characters in FIGS. 16 to 19. At its one side 49 the mounting cross-piece 40 thus does not possess any radial arm or arm member and thus none of the remaining features or aspects associated therewith; in correspondence therewith, the mounting cross-piece 50 possesses at its sides 55 and 56 which abut one another, no arms or the features or aspects associated therewith.

Figure 21:
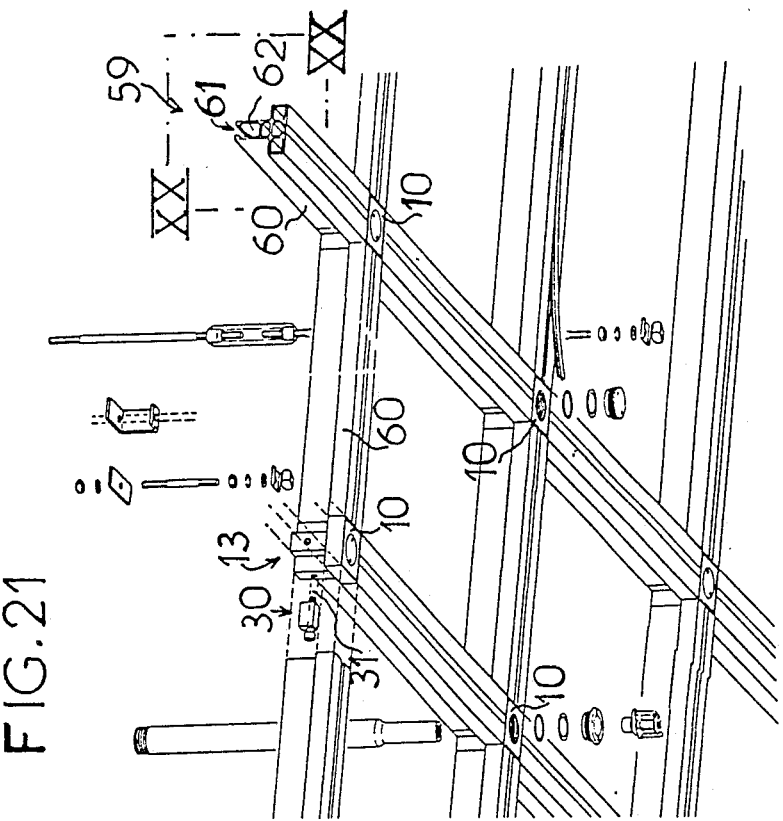
FIG. 21 is a schematic illustration of a support or carrier structure or framework defining a grid structure or grid and assembled together by means of the mounting cross-piece assemblies of the embodiments depicted in FIGS. 1 to 15.
Figure 20:
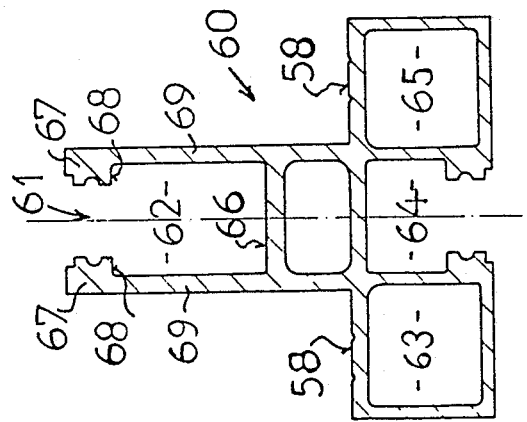
FIG. 20 is a cross-sectional view take in a plane indicated by the section line XX—XX of FIG. 21 of a first type of profile or profile section of a support or carrier structure or framework which can be connected to the mounting cross-piece assembly according to the invention.
Figure 22:
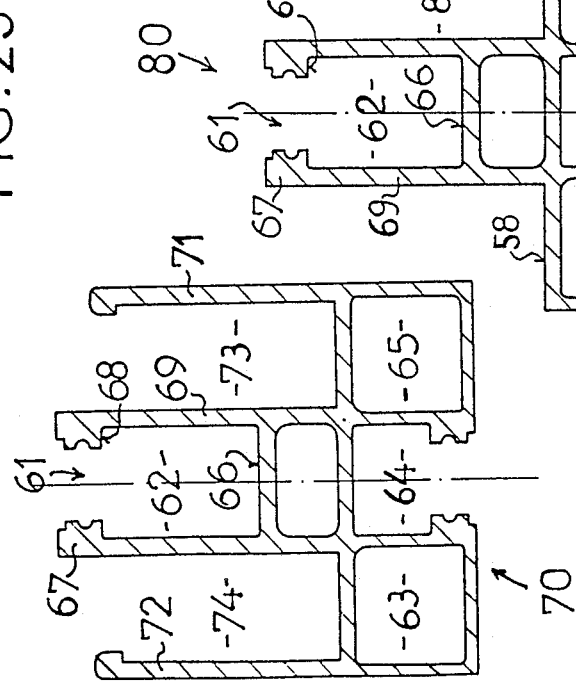
FIG. 22 is a cross-sectional view of a profile section or profile, according to a second possible construction, which can be connected with the mounting cross-piece assembly according to the invention, the sectional view being taken in a plane substantially along the section line XXII—XXII of FIG. 24.

In FIGS. 20, 21 and 22 there have been depicted the cut surfaces or cuts of three different profiles or profile sections. In FIG. 21 there has been depicted a support or carrier grid or grid structure formed of profiles or profile sections of the type depicted in FIG. 20 and mounting cross-piece assemblies of the type depicted in FIGS. 1 to 15. In FIG. 24 there has been depicted a support grid or grid structure formed of profiles or profile sections of the type depicted in FIGS. 22 and 23 and the same mounting cross-piece assemblies as shown in FIG. 21.

The profile or profile section 60 depicted in FIG. 20 is basically known. This profile or profile section 60 possesses an upwardly open lengthwise or longitudinally extending chamber or compartment 62 provided with the lengthwise or longitudinally extending opening 61 and beneath the same three chambers or compartments 63, 64 and 65. The chamber or compartment 64 which is situated at the central region or centrally beneath the chamber or compartment 62 is downwardly open. What is important during the attachment and the release of the connection element or unit 30 during the connection or joining of the mounting cross-piece 10 with the profile or profile section 60 is especially the upper chamber or compartment 62 and the lengthwise opening 61 located at its upper end and having a smaller inner width than the chamber or compartment 62 itself. This chamber or compartment 62 is provided with a base or bottom portion 66 and at its upper end, by virtue of the lesser width of the lengthwise or longitudinally extending opening 61, possesses to both sides of such lengthwise or longitudinally extending opening 61, the lengthwise or longitudinally extending rib or rib members 67. These lengthwise ribs or rib members 67 protrude at their underside 68 in a shoulder-like fashion into the upper portion of the chamber or compartment 62.

The connection element 30 is now introduced into this chamber or compartment 62 of the profile or profile section 60 from the cut surface or cut thereof, such that the tilting block or element 35 is somewhat tilted or rocked towards the rear, in other words, is inclined at its upper end towards the mounting cross-piece 10 (see FIG. 10). At its round or curved end 47, the tilting block or element 35 bears upon the chamber floor or base portion 66 of the profile or profile section 60. The one transverse rib or rib member 43 of the tilting block or element 35 bears against the underside 68 of both lengthwise ribs or rib members 67 provided at the upper portion of the profile chamber or compartment 62, as also will be observed by referring to FIG. 10.

The tilting spring or spring member 34 is structured such that its upper end with the head portion 53, the short U-shaped arm 52 and an equally long portion of the longer U-shaped arm 51 merging with the head portion 53, is smaller than the remaining lower portion or part of the U-shaped 51, so that the tilting or tilt spring 34 can move with its narrower region past the lengthwise ribs 67 and extend or protrude into the lengthwise opening 61 bounded by such lengthwise or longitudinal ribs or rib members 67.

Now if the threaded adjustment bolt 31 is further threaded into the mounting cross-piece 10, by rotating the head or head portion 32 thereof by means of a suitable tool introduced through the lengthwise opening 61 into the chamber compartment 62, then the tilting block or element 35, as described above with reference to FIG. 10, is pressed out of its neutral position into its clamping position. In the neutral position the tilting block or element 35 only bears upon the bottom or base portion 66 of the upper profile chamber or compartment 62 and only loosely lies at the underside 68 of each of the lengthwise ribs 67. In the clamped position of the tilting block or element 35 it frictionally or force-lockingly bears or clampingly engages both against the base or bottom portion 66 as well as against the rib underside 68.

The threading-in or threading-out of the adjustment threaded bolt or bolt member 31 into or out of the mounting cross-piece requires an adjustment of its position in the related profile or profile section, and thus the term "adjustable" is therefore applicable thereto.

Figure 2:
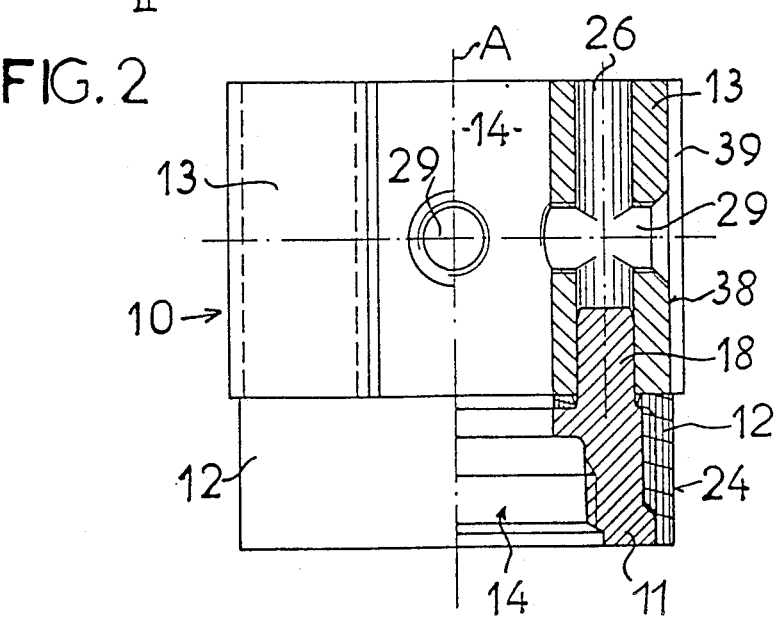
FIG. 2 is a side view of the mounting cross-piece according to FIG. 1, with the right-hand half thereof depicted in axial section, taken in a plane substantially along the line II—II of FIG. 1.
Figure 6:
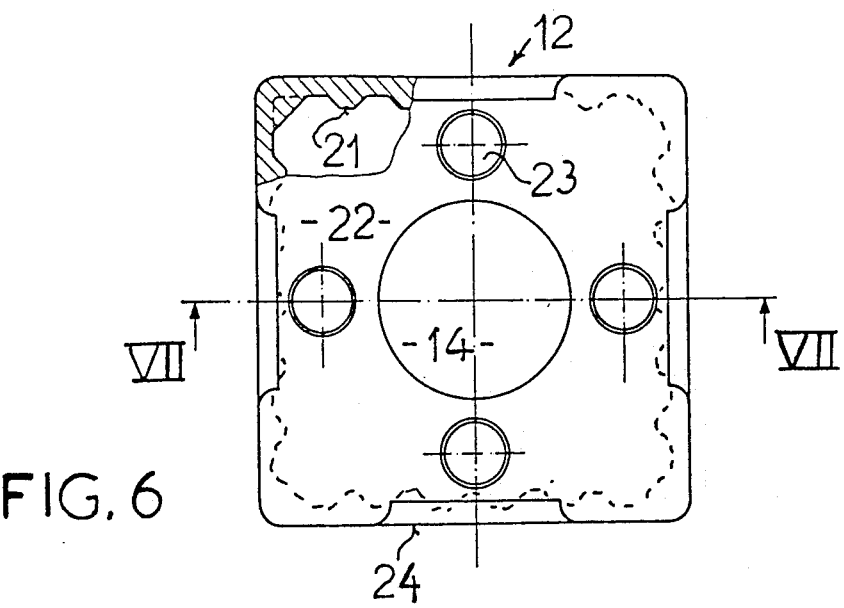
FIG. 6 illustrates in top plan view and partially in cross-sectional view a molded seal element or seal which is intended to be pressed onto the lower portion or part of the mounting cross-piece or node.
Figure 7:
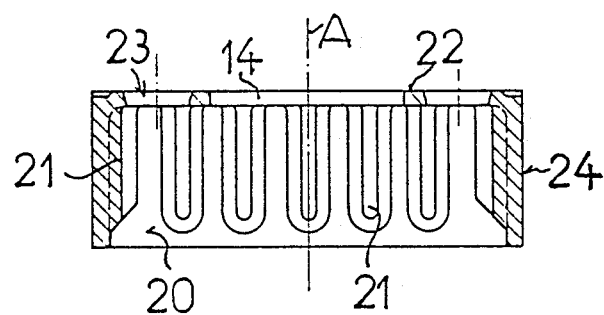
FIG. 7 is an axial sectional view through the seal element or seal of FIG. 6 in a plane taken substantially along the section line VII—VII thereof.

The tightening, in other words, the threading or screwing of the adjustment bolt member 31 deeper into the mounting cross-piece 10 causes an intensified sealing action to arise between the mounting cross-piece 10 and the profile or profile section 60, since the cut surface or cut 59 of the profile section 60 (FIG. 21) presses against the related connection or joining side 38 of the mounting cross-piece 10. As a result, the contact ledges or ledge members 39 penetrate into the profile section 60 adjacent the upper profile chamber or compartment 62 (FIG. 21), that is to say, to the right and left thereof, or into the side chambers or compartments 73 and 74 (FIG. 22) or 83 (FIG. 23), but always are guided at the outer sides of the chamber side walls 69 until the profile cut surface 59 bears in metal-to-metal contact with the end wall or side or surface 38 of the relevant arm of the mounting cross-piece 10 (FIG. 2). This frictional or force-locking connection established between metal and metal, imparts the requisite stability to the grid or grid structure.

Figure 1:
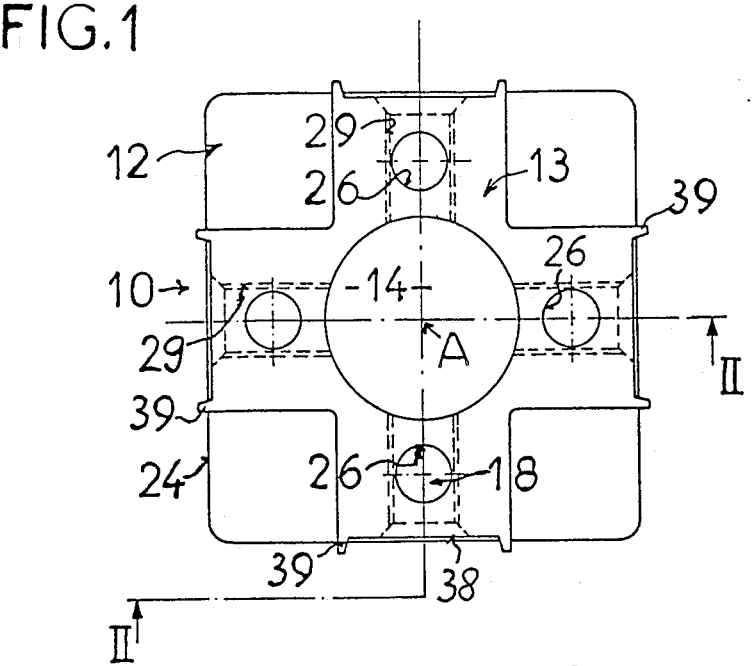
FIG. 1 is a top plan view of a preferred embodiment of a multi-part mounting cross-piece or node constructed according to the present invention.

As a result, the corresponding side surface 24 of the formed or molded seal or sealing element 12 is slightly pressed together, because it protrudes slightly past the arm end wall or surface 38 (FIGS. 1 and 2). However, it cannot be excessively loaded by virtue of the metal-to-metal contact of the surfaces 38 and 59, but rather can only experience a slight resilient action, for instance a resilient or springy motion of 0.3 to 0.5 mm.

It is extremely simple to remove the profile or profile section 60 out of the finished fabricated grid or grid structure. This can be accomplished in that a suitable tool is inserted through the lengthwise opening 61 so that the adjustment bolt or bolt member 31 can be completely threaded out of the mounting cross-piece 10. The profile or profile section 60 then can be easily removed downwardly out of the grid or grid structure together with all of the loosely therein located parts of the threaded-out connection element 30.

During re-mounting the head portion or head 32 of the adjustment bolt or bolt member 31, must be firmly held in the tool which protrudes out of the lengthwise or longitudinally extending opening 61, whereas its free end must be raised to the height of the transverse bore 29 provided at the upper portion or part 13 of the mounting cross-piece 10 and then must be partially threaded thereinto.

In the grid or grid structure which has been assembled from the profiles or profile sections 60 according to the arrangement of FIG. 21, it is possible to install filters together with their filter frames in conventional fashion. The conventional sealing frames (not shown), for instance formed of the trademarked product "NEOPREN" or similar known sealing materials are placed upon the shoulders or shoulder portions 58 formed by the chambers or compartments 63 and 65 and upon such there are placed the conventional filter frames (not shown) as such has been illustrated, for instance, in FIGS. 21 and 22 at pages 14 and 18 of the publication "Reinraum Technik Grundlagen und Anwendung", published 1986, of the assignee of this invention, Luwa AG, located at 8047 Zürich, Switzerland.

The profiles or profile sections 70 and 80 schematically depicted by their cut surfaces or cuts in FIGS. 22 and 23, serve for the construction of a support or carrier structure or framework in the form of a grid or grid structure of the type shown in perspective illustration in FIG. 24. The assembly of such support or carrier structure or grid is accomplished with the same mounting cross-pieces 10, 40 and 50, as is the case of the grid or grid structure depicted in FIG. 21.

The profile or profile section 70 is thus used internally or within the grid or grid structure, the profile or profile section 80 at its edge or periphery. Those parts of the profiles or profile sections 70 or 80 which are identical or correspond with the analogous parts of the profile or profile section 60 (FIG. 20) have been generally conveniently identified with the same reference characters as used in the profile construction of FIG. 20.

On the other hand, the profile or profile section 70, as shown in FIG. 22, is provided to the right and left of the central or intermediate upper chamber or compartment 62, with two side or lateral chambers 73 and 74 extending parallel to the central upper chamber 62 and formed by outer walls or wall members 71 and 72, respectively. In corresponding manner, and as will be seen from the illustration of FIG. 23, the profile or profile section 80, possesses a side chamber or compartment 83 formed by an outer wall 81 and extending substantially parallel to the upper chamber or compartment 62.

In the side chambers or compartments 73, 74 and 83, there is introduced a highly viscous liquid, for instance a vaseline, which is heated slightly above its melting point, in order to form a fluid seal, and in such there is then arranged the foot ledges of the suitable filter box frames (not shown).

The manner in which such is accomplished has been schematically illustrated in FIG. 10 of the aforementioned German Petty Patent No. 85 00 198.8.

The cut surface or cut 75 of the profile section 70, which can be articulatably connected to a mounting cross piece or node 10 constructed according to the present invention, has been depicted in the perspective illustration of a support or carrier structure which has been erected in such manner and as depicted in FIG. 24.

The assembly or joining together of the profile sections 70 and 80 with a mounting cross-piece 10 is accomplished in the same manner as previously considered by means of the connection elements 30 as such has been heretofore described for the profile section 60. With the thus obtained grid or grid structure according to FIG. 24, there are present at each of the four connection or joining sides, connection joints 85 (FIG. 29) between the outer wall 72a and 71b of the profile sections 70a and 70b, which are sealed by a special corner seal 90 formed of "NEOPREN" or another suitable sealing material having similar properties, and which has been depicted in FIGS. 25 to 28. This corner seal 90 carries at its base or bottom portion 91, which subtends an angle of about 270° two vertical or upright wall portions or parts 92 and 93 which abut at substantially a right angle with respect to one another and which carry at the inner side or surface lengthwise or lengthwise extending ribs or rib members 94 and 95, respectively, to the right and left of a central rib or rib member 96. Also the base or bottom portion 91 carries at its underside ring-shaped or annular ribs or rib members 97 and at its upper or top side thereof contact and reinforcement ribs or rib members 98 and 99.

FIG. 29 shows how the seal between both of the profile sections, designated in FIG. 24 by reference character 70a and 70b, are connected at substantially a right angle with respect to one another at the connection or joining sides 38a and 38b of the mounting crosspiece 10 and leave free therebetween a connection joint or join 85 which likewise appears at the other three corners of the mounting cross-piece 10.

These connection joints 85 are closed or sealed off by the corner seals or seal members 90, as the same has been shown in FIG. 29 for one of the connection joints 85. The corner seal 90 is introduced into the chambers or compartments 74a and 73b of the profile sections 70a and 70b, respectively, such that the ribs or rib members 94 of the wall portion 92 of the seal or seal member 90 are sealingly pressed against the inner side wall 72a of the chamber or compartment 74a of the profile section 70a and the rib members 95 at the wall portion 93 are sealingly pressed against the inner side wall 71b of the side or lateral chamber or compartment 73b of the profile section 70b. This is accomplished in as much as the foot or base portion 91 of the corner seal 90 is pressed with the circumferential surfaces of its contact reinforcement ribs or rib members 98 and 99 against the lateral arm surfaces 10a and 10b, respectively, of the mounting cross-piece 10. As a result, the lengthwise or longitudinal ribs or rib members 94 and 95 are sealingly pressed against the inner side walls 72a and 71b, respectively. Hence, the corner seal or seal member 90 is pressed to such a depth into the chambers or compartments 74a and 73b that its foot or base or bottom portion 91 sealingly bears at its ring-shaped or annular ribs 97 upon the base or bottom surface 73c of the chamber or compartment 73b and the base or bottom surface 74c of the chamber or compartment 74a, as well as being sealingly pressed against the sealing surface corner region 12c of the sealing element 12 and which extends between such base portion at the same level. Furthermore, the corner seal 90 comes to lie with its upper edge 90a beneath the inwardly protruding flange or flange member 86 of the chamber 73 or the flange 87 of the chamber 74 (FIG. 22), so that it continuously presses with a sealing pre-bias its base or bottom portion 91 against the aforementioned base surfaces 73c and 74c. The nose or nose member 96 of the base or bottom portion 91 is thus placed with its flanks against the ends of the neighboring profile walls 72a and 71b of the profile sections 70a and 70b, respectively.

What is important in this case, as also generally, is that each surface or corner region 12c of the molded sealing element 12 aligns as exactly as possible with the two surfaces of the shoulders 58 which abut one another at this region 12c at substantially right angles or the corresponding abutting inner base surfaces 73c, 74c (FIG. 29) of the side chambers 73, 74 (FIG. 22) or with a shoulder 58 and an inner base surface 83c of the side chamber 83 (FIG. 23), in order to prevent leakiness which could arise in the case of stepped portions between the aforementioned surfaces.

The alignment of the aforementioned base or bottom surfaces with one another is also ensured in that during the insertion of the ledge members or ribs 39 from above into the profile sections 60, 70 or 80, as the case may be, the lower ledge ends, which must be appropriately machined or processed to exactly align with the corner surface regions or corner regions 12c, are seated upon the shoulders 58 or base surfaces 73c, 74c and 83c, respectively.

Finally, in FIG. 30 there is depicted a simplified embodiment of a connection element 130 in contrast to the construction of the connection element 30 depicted in FIG. 10. The same bolt or bolt member 31 with the head portion 32, an underlay disc or shim 33 here carries, in place of the tilting block or element 35 and the blade or leaf spring 34, a tilting element 134. The lengthwise section of the tilting element 134 corresponds in configuration to a substantially S-section having flattened ends and is seated in the same manner upon the bolt or bolt member 31 as the blade or leaf spring 34 of the arrangement of FIG. 10. The lower end 134a of this tilting element 134 bears upon the base or bottom 66 of the chamber or compartment 62 between the underlay disc or shim 33 of the bolt head 32 and a counter support or bearing element 136, for instance formed of steel, and through its throughpass or opening 141 there extends the bolt or bolt member 31 toward the rear into the mounting cross-piece 10, as also was the case for the arrangement of FIG. 10.

Upon insertion of the threaded adjustment bolt member 31 which has not yet or has already been connected with the mounting cross-piece 10 together with both of the parts seated thereupon from the side of the cut surface 59 of the profile section 60 into the latter, the tilting element 134, by virtue of the friction prevailing between its upper end 134b at the shoulder 68 of the profile chamber or compartment 62, assumes an inclined rearward or rear position, that is to say, is inclined with its end 134b towards the mounting cross-piece 10. As a result, the tilting element 134 can be inserted in this posture until reaching a desired position into the profile chamber or compartment 62, and the threaded adjustment bolt or bolt member 31 should only be threaded-in to such an extent that it affords an appropriate play of the tilting or tilt element 134.

This rearward tilting or inclination of the tilting element 134 is accomplished against the force of a compression or pressure spring 137. This compression or pressure spring 137 is supported at its one end at the base or floor of an axial bore 138 of the counter support or bearing element 136 and at its other outer end bears against the rear side 134c of the tilting element 134. This compression or pressure spring 137 loads the upper end of the tilting element 134 in axial direction away from the mounting cross-piece 10 towards the bolt head 32. To ensure that the compression or pressure spring 137 can not push the counter support or bearing element 136 away from the tilting element 134, during tilting of the tilting or tilt element 134, both parts are held together by a tightening clamp or clamp member 139. This tightening clamp or clamp member 139 engages at the rear end surface 136a of the counter support or bearing element 136, on the one hand, and at the front side 134d of the tilting element 134, on the other hand. Now if there is accomplished a stronger or more pronounced tightening of the connection element 130 by screwing the threaded adjustment bolt 131 more deeply into the bore or hole 29 of the mounting cross-piece 10, then the underlay disc or shim 33 rearwardly displaces the lower end 134a of the tilting element 134, that is to say, in the direction of the mounting cross-piece 10. During such motion the tilting or tilt element 134 pivots or rocks about the end of the tightening clamp or clamp member 139 which bears thereat and seizes or clamps at its lower end 134a at the base surface 66 and at its upper end 134b seizes or clamps at both shoulders or underside regions 68 located to the right and left of the lengthwise or longitudinal slot or opening 61 of the profile section 60. At its upper end surface 134b the tilting or tilt element 134 also can possess a small guide nose or nose member (not shown) which protrudes into the lengthwise slot 61 or opening to enhance the guiding of the tilting or tilt element 134.

A partial threading-out of the threaded adjustment bolt or bolt member 31 out of the bore or hole 29 releases the clamping action. The tilting element 134 can again tilt or pivot at an inclination rearwardly with its upper end 134a and can then be displaced more deeply into the chamber or compartment 62 of the profile section 60. If the entire connection element 130 is to be removed out of the profile section which is to be detached from the grid structure, then the tilting element 134, by applying a suitable pressure with the finger or with a screwdriver or other appropriate tool, can again be tilted rearwardly at the upper region of the front side 134d and the entire unit then can be pushed or displaced out of the profile section 60.

By virtue of the simple manner of establishing the sealed or leak-proof connection between the mounting cross-pieces and the profile sections according to the present invention, it is possible to undertake the mounting or installation of the grid structure from its upper side at the contemplated erection site, without there being necessitated a specially equipped factory or plant or workshop. What is required for the mounting or assembly work is the provision of a suitable cutting instrument, typically a circular saw, for cutting profile sections of desired length, an inner hexagonal-ball head tool or the like, and if necessary, a screwdriver, and basically nothing else.

While there are shown and described present preferred embodiments of the invention, it is to be distinctly understood that the invention is not limited thereto, but may be otherwise variously embodied and practiced within the scope of the following claims.

What I claim is:

1. A mounting cross-piece assembly for the sealed connection of cut ends of profile sections of a support structure which is to be suspended at the ceiling of a room, especially for filter frames of clean room filters which are to be mounted in the support structure, each profile section including a generally elongated body having a lengthwise opening in an upper surface thereof, said mounting cross-piece assembly comprising:
    at least one mounting cross-piece;
    a connection element insertable into a cut end of a profile section to be connected with a said mounting cross-piece and into a side of the mounting cross-piece of the mounting cross-piece assembly confronting the profile section;
    said connection element being connectable to the profile section and being frictionally connected with the mounting cross-piece;
    said connection element comprising a support element retained in the mounting cross-piece, said support element being adjustable in a lengthwise direction thereof, said connection element further comprising a tilting element pivotally seated upon said support element, said tilting element being movable from a neutral position into a position frictionally engaged with a wall of the profile section by adjusting the support element through the upper lengthwise opening of the profile section whereby the profile section is frictionally connected with the connection element and the profile section is pressed against the mounting cross-piece to form a rigid structure;
    said connection element being releasable from above through the upper lengthwise opening of the profile section in a finished assembled support structure;
    whereby at least said profile section is removable in one piece from between two cross-pieces of said support structure after said connection element has been released.

2. The mounting cross-piece assembly as defined in claim 1, wherein:
    said mounting cross-piece is removable out of the support structure without necessitating cutting of the profile section or destruction of the mounting cross-piece or a remaining part of the support structure.

3. The mounting cross-piece assembly as defined in claim 1, wherein:
    the profile section can again be installed at the support structure following its removal.

4. The mounting cross-piece assembly as defined in claim 3, wherein:
    said support element comprises a bolt member;
    said bolt member having an end portion provided with thread means;
    said side of said mounting cross-piece confronting the profile section having a threaded hole; and
    said end portion of the bolt member provided with said thread means being threadably connected with the threaded hole of said side of the mounting cross-piece.

5. The mounting cross-piece assembly as defined in claim 4, wherein:
    said side of the mounting cross-piece confronting the profile section being intended to be joined with the mounting cross-piece;
    said connection element comprising a tilting element having a side confronting the mounting cross-piece and movable into a frictionally-engaging position with the profile section;
    a compression spring having opposed ends;
    one end of said opposed ends of said compression spring bearing at said side of said mounting cross-piece;
    the other end of said opposed ends of said compression spring bearing at said side of the tilting element; and
    said adjusting element bearing at the support element during pressing of the tilting element into said frictionally-engaging position.

6. The mounting cross-piece assembly as defined in claim 5, wherein:
    said adjusting element comprises a blade spring.

7. The mounting cross-piece assembly as defined in claim 1, wherein:
    the mounting cross-piece can again be installed in the support structure following its removal.

8. The mounting cross-piece assembly as defined in claim 1, wherein:

said support element allows placement of the tilting element from the position where it frictionally engages with the profile section back into the neutral position.

9. The mounting cross-piece assembly as defined in claim 1, wherein:
said connection element further comprises a resilient element which loads the tilting element in the neutral position thereof; and
said connection element further comprising an adjusting element which upon adjustment of the support element in its lengthwise direction presses the tilting element into the frictionally engaging position thereof.

10. The mounting cross-piece assembly as defined in claim 9, wherein:
said resilient element comprises a compression spring;
said side of the mounting cross-piece confronting the profile section being intended to be joined with the mounting cross-piece;
said tilting element having a side confronting the mounting cross-piece;
said compression spring having opposed ends;
one end of said opposed ends of said compression spring bearing at said side of said mounting cross-piece;
the other end of said opposed ends of said compression spring bearing at said side of the tilting element; and
said adjusting element bearing at the support element during pressing of the tilting element into its frictionally-engaging position.

11. The mounting cross-piece assembly as defined in claim 10, wherein:
said adjusting element comprises a blade spring.

12. A mounting cross-piece assembly for the sealed connection of cut ends of profile sections of a support structure which is to be suspended at the ceiling of a room, especially for filter frames of clean room filters which are to be mounted in the support structure, each profile section including a generally elongated body having a lengthwise opening in an upper surface thereof, said mounting cross-piece assembly comprising:
at least one mounting cross-piece;
a connection element insertable into a cut end of a profile section to be connected with a said mounting cross-piece and into a side of the mounting cross-piece of the mounting cross-piece assembly confronting the profile section;
said connection element being connectable to the profile section and being frictionally connected with the mounting cross-piece;
said connection element being releasable from above through the upper lengthwise opening of the profile section in a finished assembled support structure;
whereby at least said profile section is removable in one piece from between two cross-pieces of said support structure after said connection element has been released;
said mounting cross-piece comprises at least two connection surfaces contactable with cut surfaces of a plurality of profile sections;
said connection element further comprising a tilting element pivotally seated upon said support element, said tilting element being movable from a neutral position into a position frictionally engaged with a wall of the profile sections;
each of said connection surfaces containing a bore capable of receiving a related connection element;
said mounting cross-piece comprising a multi-part mounting cross-piece;
said multi-part mounting cross-piece comprising:
a lower portion;
seal means which at least partially cover the lower portion at least in zones beneath the connection surface; and an upper portion;
said upper portion of said mounting cross-piece being provided at least at two sides with guide means; and
said guide means connecting respectively with a respective one of the connection surfaces as well as with a cut surface of the profile section associated with the connection surface.

13. The mounting cross-piece assembly as defined in claim 12, wherein:
said mounting cross-piece is provided with a substantially central throughpass channel extending substantially vertically therethrough.

14. The mounting cross-piece assembly as defined in claim 12, wherein:
said mounting cross-piece has a substantially quadratic cross-sectional configuration.

15. The mounting cross-piece assembly as defined in claim 12, wherein:
said connection surfaces are substantially vertically arranged.

16. The mounting cross-piece assembly as defined in claim 12, wherein:
said guide means protrude past said mounting cross-piece and guidingly extend along the cut surfaces of the profile section to be connected therewith and into such profile section.

17. The mounting cross-piece assembly as defined in claim 16, wherein:
said guide means comprise two ledge members formed at the upper portion of the mounting cross-piece at the connection surfaces;
said connection surfaces being provided with bore means;
said ledge members being located laterally of said bore means; and
said ledge members protruding past said lower portion of said mounting cross-piece.

18. The mounting cross-piece assembly as defined in claim 17, wherein:
said bore means comprise threaded holes provided at said connection surfaces.

19. The mounting cross-piece assembly as defined in claim 12, wherein:
said upper portion of said mounting cross-piece constitutes an extruded member.

20. A mounting cross-piece for use in a mounting cross-piece assembly, comprising:
at least two joining surfaces for the adjoinment of cut surfaces of profile sections thereat;
each of said at least two joining surfaces being provided with means intended for receiving a connection element for securing the profile sections at the region of each said at least two joining surfaces;
said connection element comprising a tilting element pivotally seated upon a support element, said tilting element being movable from a neutral position into a position frictionally engaged with a wall of the profile sections;

said mounting cross-piece comprising a multi-part mounting cross-piece;

said multi-part mounting cross-piece comprising:
 a lower portion;
 seal means cooperating with said lower portion; and
 an upper portion;

said upper portion being provided at least at two sides with guide means; and each said guide means at each of said at least two sides of said upper portion coacting with a respective one of said at least two joining surfaces as well as with a cut surface of the profile section coacting therewith.

21. The mounting cross-piece as defined in claim 20, wherein:
 said guide means protrude past the lower portion.

22. The mounting cross-piece as defined in claim 20, wherein:
 said mounting cross-piece is provided with a substantially central throughpass means extending substantially perpendicularly therethrough.

23. The mounting cross-piece as defined in claim 20, wherein:
 said mounting cross-piece has a substantially quadratic cross-sectional configuration.

24. The mounting cross-piece as defined in claim 20, wherein:
 said joining surfaces are substantially vertically oriented in a mounted position of the mounting cross-piece.

* * * * *